(12) United States Patent
Lee et al.

(10) Patent No.: US 10,532,777 B2
(45) Date of Patent: Jan. 14, 2020

(54) CENTER FLOOR PANEL FOR VEHICLE

(71) Applicants: Hyundai Motor Company, Seoul (KR); Kia Motors Corporation, Seoul (KR)

(72) Inventors: Byeong Cheon Lee, Seoul (KR); Hee Seouk Chung, Gyeonggi-do (KR); Hyunsik Kim, Seoul (KR); Deok Hwa Hong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 15/939,718

(22) Filed: Mar. 29, 2018

(65) Prior Publication Data

US 2019/0176901 A1    Jun. 13, 2019

(30) Foreign Application Priority Data

Dec. 8, 2017  (KR) .......................... 10-2017-0168219

(51) Int. Cl.
   *B62D 25/20*   (2006.01)
   *B60K 1/04*    (2019.01)

(52) U.S. Cl.
   CPC ............ *B62D 25/2027* (2013.01); *B60K 1/04* (2013.01); *B62D 25/2018* (2013.01); *B62D 25/2036* (2013.01); *B60K 2001/0438* (2013.01)

(58) Field of Classification Search
   CPC ...... B60K 1/04; B62D 25/20; B62D 25/2018; B62D 25/2027; B62D 25/2045
   USPC .................. 296/187.08, 193.07, 204
   See application file for complete search history.

(56) References Cited

U.S. PATENT DOCUMENTS

| | | | | |
|---|---|---|---|---|
| 2,710,222 | A * | 6/1955 | Barenyi ................. | B62D 21/10 296/204 |
| 10,370,035 | B2 * | 8/2019 | Fees ......................... | B60K 1/04 |
| 2004/0155487 | A1 * | 8/2004 | Joaquin .................. | B62D 25/20 296/204 |
| 2014/0170342 | A1 * | 6/2014 | Peitz .................... | B62D 29/005 428/34.1 |

FOREIGN PATENT DOCUMENTS

EP    1253067 A1 * 10/2002  ............. B62D 21/17

* cited by examiner

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

A vehicle center floor panel is provided. A front end thereof is connected with a dash panel partitioning a front body of the vehicle and a vehicle interior room. A rear end thereof is connected with a rear crossmember disposed at a front end of a rear body to be crossed in a width direction of the vehicle. The center floor panel includes center floor members that have a U-shaped floor tunnel portion and a floor side extended portion formed integrally with the floor tunnel portion to extend toward sides from the floor tunnel portion, and spaced apart in a front and rear direction of the vehicle. Center crossmembers include a U-shaped cross tunnel portion to connect the floor tunnel portions and a cross side extended portion combined to the cross tunnel portion from both sides in a width direction of the vehicle to connect the floor side extended portions.

14 Claims, 5 Drawing Sheets

CENTER FLOOR PANEL FOR VEHICLE

CROSS-REFERENCE TO RELATED APPLICATION

This application claims priority to and the benefit of Korean Patent Application No. 10-2017-0168219 filed in the Korean Intellectual Property Office on Dec. 8, 2017, the entire contents of which are incorporated herein by reference.

BACKGROUND

(a) Field of the Invention

The present invention relates to a center floor panel for a vehicle, and more particularly, to a center floor panel for a vehicle having a tunnel portion that creates a space through which a high voltage wire is passed.

(b) Description of the Related Art

Generally, a floor panel that forms a bottom surface of a vehicle body includes a front floor panel, a center floor panel, and a rear floor panel from a front of a vehicle in a front and rear direction. An accelerator pedal, a brake pedal, a seat for a passenger, and the like may be mounted on an upper surface of the center floor panel, and an exhaust pipe, a propeller shaft, and the like may be mounted on a lower surface of the center floor panel. Particularly, for a vehicle which includes a propeller shaft that passes in a front and rear direction of a vehicle such as a vehicle which includes an engine mounted to a front portion and a rear wheel is a driving wheel, a tunnel through which the propeller shaft is passed is formed at the center floor panel. The tunnel is formed to have a cross-section in a "U" shape to be concave upwardly, and the propeller shaft is disposed in a hollow of the "U" shape.

Further, an electric vehicle to represent all vehicles moved by electric power including a hybrid electric vehicle may be configured so that an engine is generally mounted to a front portion and a front wheel is a driving wheel and a battery is mounted to the center floor panel or the rear floor panel. Therefore, an element such as the tunnel is not required for an ordinary electric vehicle, and rigidity of a floor panel for mounting the battery is further required compared to an internal combustion engine vehicle.

However, in an electric vehicle, spaces for arranging components such as a high voltage wire which passes in a front and rear direction of a vehicle for connecting the battery with a drive motor are insufficient, and when the high voltage wire is mounted in a side sill together with components such as a brake hose, a heater hose, a cooling pipe, and the like, risk may be increased as impact energy which a front side member and a side sill receive in an offset collision such as an overlap is transferred to the high voltage wire which is mounted in a narrow space. Meanwhile, when the floor panel is imprudently transformed such that a space for arranging a component such as the high voltage wire is made, rigidity of a vehicle body may be deteriorated.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a center floor panel for a vehicle having advantages of improving a space in which a component such as a high voltage wire is arranged, and simultaneously ensuring rigidity of a vehicle body.

A center floor panel for a vehicle according to an exemplary embodiment of the present invention may have a front end thereof connected with a dash panel partitioning a front body of a vehicle body and an interior room of a vehicle and a rear end thereof connected with a rear crossmember disposed at a front end of a rear body of a vehicle body to be crossed in a width direction of a vehicle body.

The center floor panel may include a plurality of center floor members including a floor tunnel portion having a cross-section in a "U" shape to be convex upwardly when viewed in a front and rear direction of a vehicle body and a floor side extended portion integrally formed with the floor tunnel portion to be extended toward both sides in a width direction of a vehicle body from the floor tunnel portion, and arranged to be spaced apart from each other in a front and rear direction of a vehicle body, and a plurality of center crossmembers including a cross tunnel portion having a cross-section in a "U" shape to be convex upwardly when viewed in a front and rear direction of a vehicle body to connect the plurality of floor tunnel portions and a cross side extended portion combined to the cross tunnel portion from both sides in a width direction of a vehicle body to connect the plurality of floor side extended portions, and arranged in a front and rear direction of a vehicle body.

A high voltage wire may be disposed in a tunnel portion formed by alternately coupling the cross tunnel portion and the floor tunnel portion and thus, a hollow (e.g., an empty space) of a "U" shape passes in a front and rear direction of a vehicle body. The high voltage wire may transmit electric power of a battery which is disposed at the rear body to a drive motor which is disposed at the front body. Additionally, side sills, which extend in a front and rear direction of a vehicle body, may be coupled to both sides of a vehicle body width direction of the center floor member and the center crossmember.

A front extended portion, which extends forwardly from the floor tunnel portion to be inserted into the dash panel, may be formed at a foremost center floor member among the plurality of center floor members. The front extended portion may have a cross-section that corresponds with the floor tunnel portion, and a space that corresponds with a cross-sectional shape of the front extended portion may be formed at a lower end of the dash panel to couple the front extended portion to the dash panel therethrough.

At the foremost center floor member, welding portions to be welded with the dash panel may be formed at a front end of the floor side extended portion, at both ends of the front extended portion in a width direction of the vehicle body, and at a front end of the front extended portion. A rear extended portion, which extends backwardly from the floor tunnel portion to be inserted into the rear crossmember, may be formed at a rearmost center floor member among the plurality of center floor members. The rear extended portion may have a cross-section that corresponds with the floor tunnel portion, and a space that corresponds with a cross-sectional shape of the rear extended portion may be formed at a lower end of the rear crossmember to couple the rear extended portion to the rear crossmember therethrough.

The cross tunnel portion and the cross side extended portion may be formed to have a cross-section in a box shape when viewed in a width direction of a vehicle body. The box shape of the cross side extended portion may be inserted into the box shape of the cross tunnel portion. A supporting surface may be formed to face a direction of inserting the cross side extended portion at the cross tunnel portion for supporting the cross side extended portion. Additionally, welding portions to be respectively welded with a rear end of the center floor member and a front end of the center floor member may be formed at the front ends and the rear ends of the cross tunnel portion and the cross side extended portion. A plurality of ribs may be formed in a shape to connect an upper surface with a lower surface in the box shape at the cross side extended portion. The cross side extended portion is manufactured using die casting.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DESCRIPTION OF SYMBOLS

Figure 1:
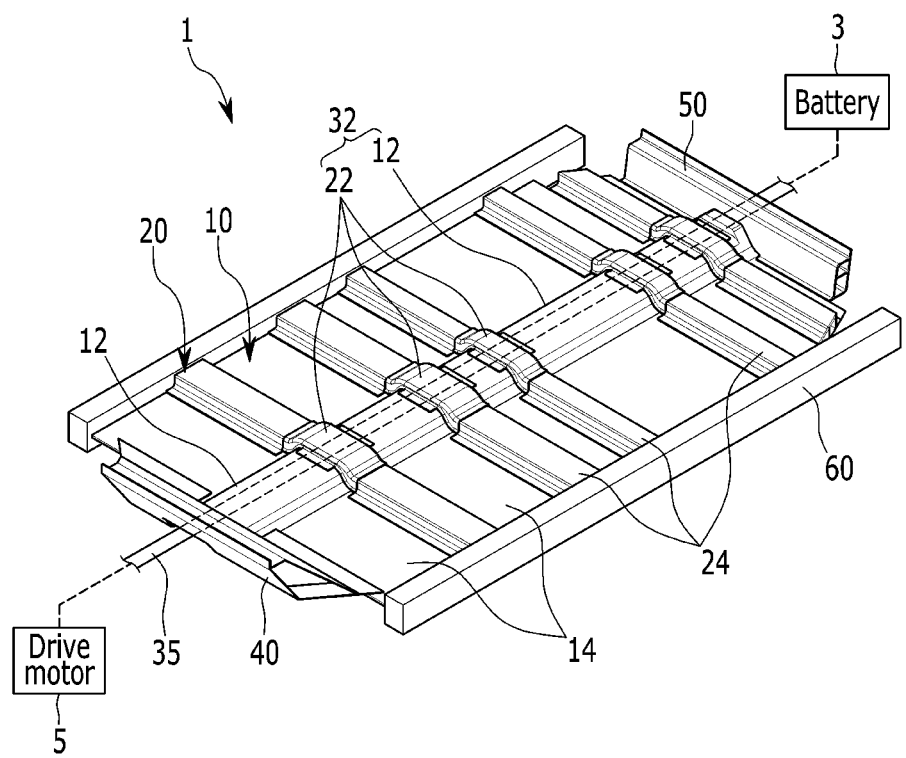
FIG. 1 is a schematic diagram of a center floor panel for a vehicle according to an exemplary embodiment of the present invention.

1: center floor panel
3: battery
5: drive motor
10: center floor member
12: floor tunnel portion
12f: front extended portion
12r: rear extended portion
14: floor side extended portion
20: center crossmember
22: cross tunnel portion
22s: supporting surface
24: cross side extended portion
24r: rib
32: tunnel portion
35: wire
40: dash panel
50: rear crossmember
60: side sill
W: welding portion

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings.

FIG. 1 is a schematic diagram of a center floor panel for a vehicle according to an exemplary embodiment of the present invention. As shown in FIG. 1, a center floor panel 1 for a vehicle according to an exemplary embodiment of the present invention may include a center floor member 10, a center crossmember 20, and a tunnel portion 32.

It is well known to a person of ordinary skill in the art that the center floor panel 1 is disposed between rear ends of a front side member (not shown) and a front floor panel (not shown) which are included by a front body of a vehicle body and front ends of a rear side member (not shown) and a rear floor panel (not shown) which are included by a rear body of a vehicle body, a front end of the center floor panel 1 is connected with a dash panel 40 which partitions the front body and an interior room of a vehicle, and a rear end of the center floor panel 1 is connected with a rear crossmember 50 which is disposed to cross in a width direction of a vehicle body at a front end of the rear body, so a detailed description thereof will be omitted.

Furthermore, the center floor member 10 may include a floor tunnel portion 12 formed to have a cross-section in a "U" shape to be convex upwardly when viewed in a front and rear direction of a vehicle body, and a floor side extended portion 14 formed integrally with the floor tunnel portion 12 and extended toward both sides in a width direction of a vehicle body from the floor tunnel portion 12. In addition, an entire shape of the center floor member 10 may have a plate shape with a predetermined length in a front and rear direction of vehicle body. Further, the center floor member 10 is provided in plural, and the plurality of center floor members 10 may be spaced from each other in a front and rear direction of a vehicle body.

The center crossmember 20 may be disposed in gaps between center floor members 10 to connect the plurality of center floor members 10 with each other. In other words, the center crossmember 20 is provided in plural, the plurality of center crossmembers 20 may be disposed in a front and rear direction of a vehicle body, and the center floor members 10 and the center crossmembers 20 may be arranged alternately to form the center floor panel 1. The center crossmember 20 may include a cross tunnel portion 22 formed to have a cross-section in a "U" shape to be convex upwardly when viewed in a front and rear direction of a vehicle body, and a cross side extended portion 24 which may be combined with the cross tunnel portion 22 from both sides in a width direction of a vehicle body and extended toward both sides in a width direction of a vehicle body from the cross tunnel portion 22. In addition, the cross tunnel portion 22 may be coupled with the floor tunnel portion 12, and the cross side extended portion 24 may be coupled with the floor side extended portion 14.

The tunnel portion 32 may be formed by alternately coupling the cross tunnel portion 22 and the floor tunnel portion 12 and thus, a hollow of a "U" shape (e.g., the empty or vacant space within the shape) passes from the front end of the center floor panel 1 to the rear end of the center floor panel 1. A high voltage wire 35, which passes in a front and rear direction of a vehicle body of an electric vehicle to connect a battery 3 with a drive motor 5 for transmitting electric power of the battery 3 which is disposed at the rear body to the drive motor 5 which is disposed at the front body, may be disposed in the tunnel portion 32. In other words, the center floor panel 1 for a vehicle according to an exemplary embodiment of the present invention is applied to an electric vehicle, and herein, the electric vehicle represents all vehicles being moved by electric power and including a hybrid electric vehicle.

In particular, side sills 60, which extend in a front and rear direction of a vehicle body, may be coupled to respective sides of a vehicle body width direction of the center floor member 10 and the center crossmember 20. The side sills 60 are well known to a person of ordinary skill in the art, so a detailed description thereof will be omitted. Meanwhile, a conventional high voltage wire is disposed in a side sill, and thus, a risk of damage of the high voltage wire by impact energy transferred to the side sill on an offset collision such as an overlap is present.

Figure 2:
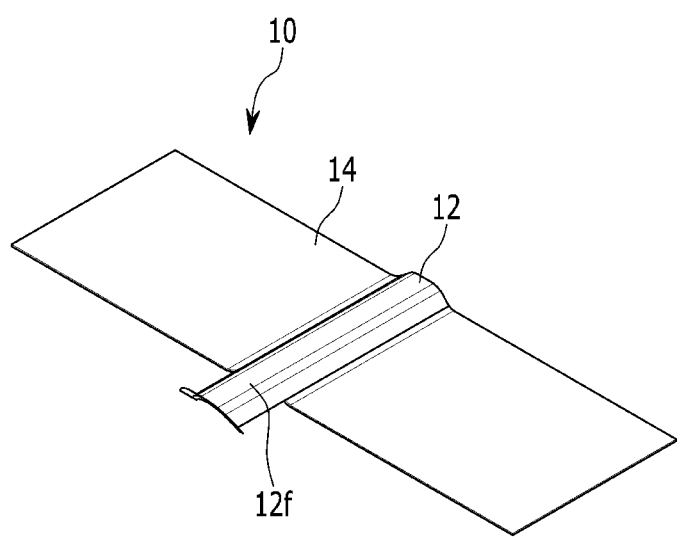
FIG. 2 is a schematic diagram of a foremost center floor member of a center floor panel for a vehicle according to an exemplary embodiment of the present invention.
Figure 3:
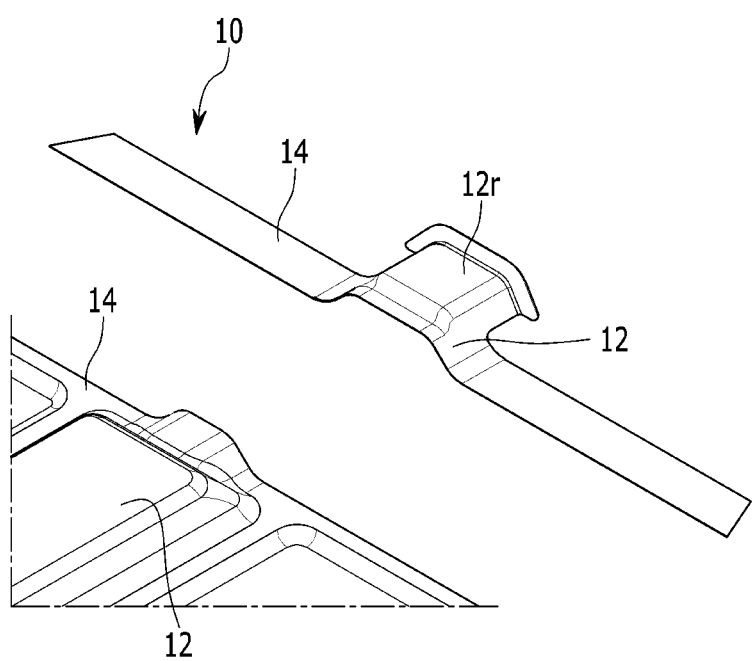
FIG. 3 is a schematic diagram of a rearmost center floor member of a center floor panel for a vehicle according to an exemplary embodiment of the present invention.

FIG. 2 is a schematic diagram of a foremost center floor member of a center floor panel for a vehicle according to an exemplary embodiment of the present invention, and FIG. 3 is a schematic diagram of a rearmost center floor member of a center floor panel for a vehicle according to an exemplary embodiment of the present invention. As shown in FIG. 2 and FIG. 3, a front extended portion 12*f* may be formed at a foremost center floor member 10 among the plurality of center floor members 10, and a rear extended portion 12*r* may be formed at a rearmost center floor member 10 among the plurality of center floor members 10.

The front extended portion 12*f* may extend forwardly from the floor tunnel portion 12. In addition, the front extended portion 12*f* may have a cross-section that corresponds with the floor tunnel portion 12, and the front extended portion 12*f* is inserted into the dash panel 40. Herein, a space that corresponds with a cross-sectional shape of the front extended portion 12*f* may be formed at a lower end of the dash panel 40 and thus, the front extended portion 12*f* may be inserted therein (referring to FIG. 4). The rear extended portion 12*r* may extend backwardly from the floor tunnel portion 12. In addition, the rear extended portion 12*r* may have a cross-section that corresponds with the floor tunnel portion 12, and the rear extended portion 12*r* may be inserted into the rear crossmember 50. Herein, a space that corresponds with a cross-sectional shape of the rear extended portion 12*r* may be formed at a lower end of the rear crossmember 50 and thus, the rear extended portion 12*r* may be inserted therein (referring to FIG. 4).

Figure 4:
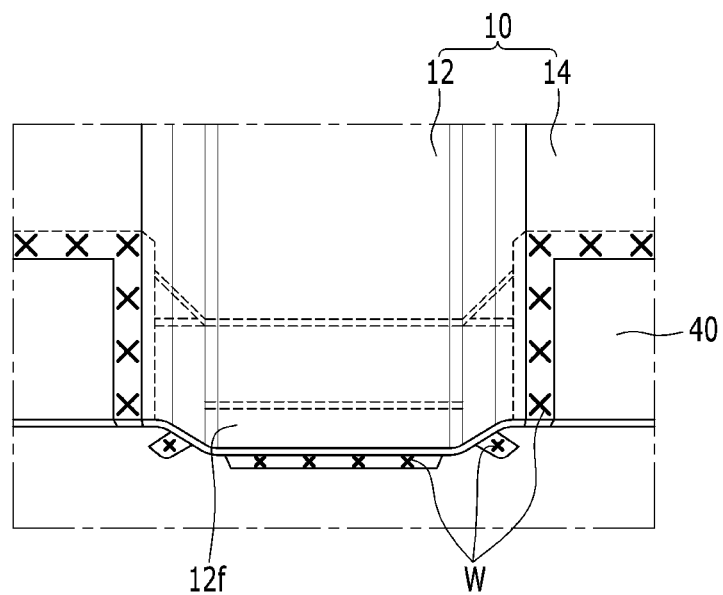
FIG. 4 is a drawing illustrating combination of a dash panel and a foremost center floor member of a center floor panel for a vehicle according to an exemplary embodiment of the present invention.

FIG. 4 is a drawing illustrating combination of a dash panel and a foremost center floor member of a center floor panel for a vehicle according to an exemplary embodiment of the present invention. FIG. 4 is a bottom view, and while only combination of the foremost center floor member 10 and the dash panel 40 is illustrated in FIG. 4, the rearmost center floor member 10 and the rear crossmember 50 are also combined in the same way.

As shown in FIG. 4, welding portions W may be formed at a front end of the floor side extended portion 14 of the foremost center floor member 10 and both ends of the front extended portion 12*f* in a width direction of a vehicle body. In addition, a welding portion W may be welded with the dash panel 40 when overlapped on the lower end of the dash panel 40. Further, welding portions W are further formed at a front end of the front extended portion 12*f*, and the welding portion W formed at the front end of the front extended portion 12*f* may be welded with the dash panel 40 when overlapped on a front end of the dash panel 40. Welding points are illustrated as "X" in FIG. 4, and welding is not performed in both directions of a panel but in one direction depending on a configuration with which the welding portion W is overlapped with the dash panel 40.

Figure 5:
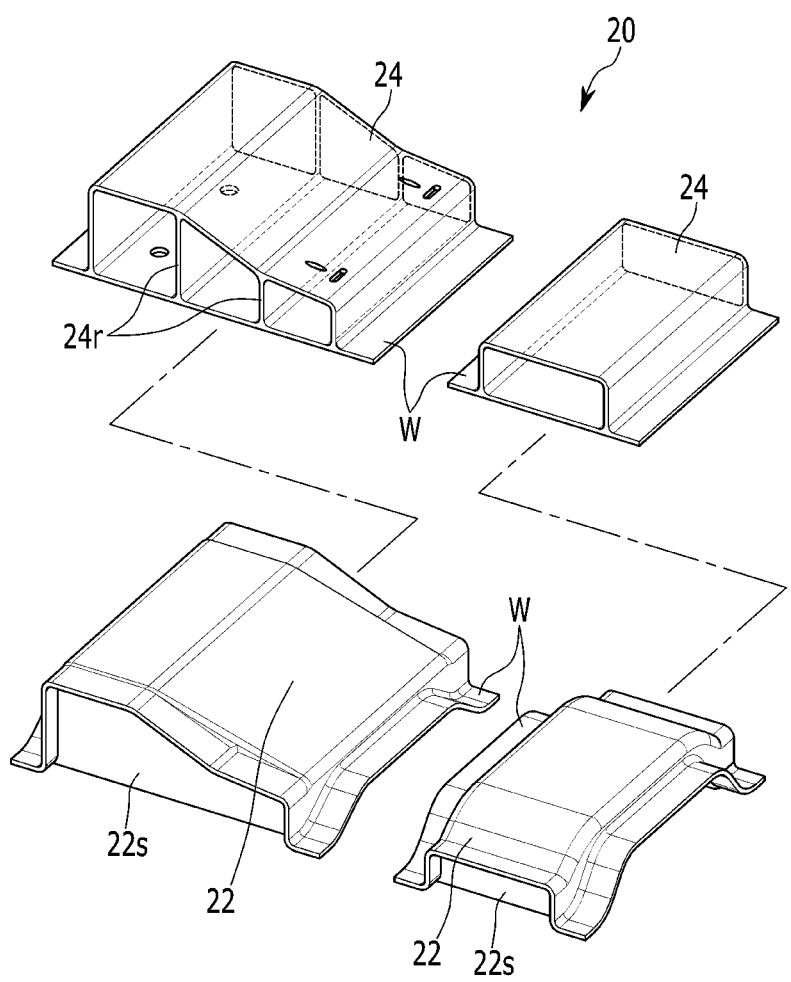
FIG. 5 is a detailed view of a center crossmember of a center floor panel for a vehicle according to an exemplary embodiment of the present invention.

FIG. 5 is a detailed view of a center crossmember of a center floor panel for a vehicle according to an exemplary embodiment of the present invention. As shown in FIG. 5, the cross tunnel portion 22 and the cross side extended portion 24 may be formed to have a cross-section in a box shape when viewed in a width direction of a vehicle body. In addition, the box shape of the cross side extended portion 24 may be inserted into the box shape of the cross tunnel portion 22. Herein, at the cross tunnel portion 22, a supporting surface 22*s* may be formed to face a direction in which the cross side extended portion 24 is inserted into the cross tunnel portion 22 to support the cross side extended portion 24. Further, welding portions W may be formed at the front ends and the rear ends of the cross tunnel portion 22 and the cross side extended portion 24. The welding portions W formed at the front ends of the cross tunnel portion 22 and the cross side extended portion 24 may be welded to the rear end of the center floor member 10, and the welding portions W formed at the rear ends of the cross tunnel portion 22 and the cross side extended portion 24 may be welded to the front end of the center floor member 10.

A plurality of ribs 24*r* may be formed at the cross side extended portion 24. In particular, the plurality of ribs 24*r* may be formed in a shape which connects an upper surface with a lower surface in the box shape of the cross side extended portion 24. In addition, the cross side extended portion 24 may be manufactured using die casting with less constraints of a shape. Herein, the die casting is an exact casting process in which a casting is gained by injecting a melted metal into a die which is exactly manufactured with mechanical to completely correspond to a shape of a required component, and the die casting is well known to a person of ordinary skill in the art.

According to an exemplary embodiment of the present invention, a space for arranging a component such as the high voltage wire 35 may be formed in the tunnel portion 32. In addition, a space formed at the dash panel 40 and the rear crossmember 50 for forming the tunnel portion 32 may be blocked and rigidity may be ensured as the floor tunnel portion 12 is extended in a front and rear direction and is combined to the dash panel 40 and the rear crossmember 50. Further, rigidity may be ensured as the center crossmember 20 is formed by coupling the cross side extended portion 24 manufactured by using die casting to have the plurality of ribs 24r with the cross tunnel portion 22. In addition, by avoiding the placement of a component such as the high voltage wire 35 in the side sill 60, impact energy being transferred to the high voltage wire 35 in an offset collision such as an overlap may be prevented.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A center floor panel for a vehicle, comprising:
a dash panel that partitions a front body of the vehicle and an interior room of the vehicle, wherein a front end of the center floor panel is connected with the dash panel and a rear end of the center floor panel is connected with a rear crossmember disposed at a front end of a rear body of a vehicle body to be crossed in a width direction of the vehicle body;
a plurality of center floor members including a floor tunnel portion having a cross-section in a "U" shape to be convex upwardly when viewed in a front and rear direction of the vehicle body and a floor side extended portion formed integrally with the floor tunnel portion to extend toward both sides in the width direction of the vehicle body from the floor tunnel portion, and arranged to be spaced apart from each other in the front and rear direction of the vehicle body; and
a plurality of center crossmembers including a cross tunnel portion having a cross-section in a "U" shape to be convex upwardly when viewed in the front and rear direction of the vehicle body to connect the plurality of floor tunnel portions and a cross side extended portion combined to the cross tunnel portion from both sides in the width direction of the vehicle body to connect the plurality of floor side extended portions, and arranged in the front and rear direction of the vehicle body,
wherein a high voltage wire is disposed in a tunnel portion formed by alternately coupling the cross tunnel portions and the floor tunnel portions to cause a hollow of a "U" shape to pass in a front and rear direction of the vehicle body.

2. The center floor panel of claim 1, wherein the high voltage wire transmits electric power of a battery which is disposed at the rear body to a drive motor which is disposed at the front body.

3. The center floor panel of claim 1, wherein side sills, which extend in the front and rear direction of the vehicle body, are coupled to both sides of the vehicle body width direction of the center floor member and the center crossmember.

4. The center floor panel of claim 1, wherein a front extended portion, which extends forwardly from the floor tunnel portion to be inserted into the dash panel, is formed at a foremost center floor member among the plurality of center floor members.

5. The center floor panel of claim 4, wherein the front extended portion has a cross-section that corresponds with the floor tunnel portion, and a space that corresponds with a cross-sectional shape of the front extended portion is formed at a lower end of the dash panel to couple the front extended portion to the dash panel therethrough.

6. The center floor panel of claim 4, wherein at the foremost center floor member, welding portions to be welded with the dash panel are formed at a front end of the floor side extended portion, at both ends of the front extended portion in the width direction vehicle body, and at a front end of the front extended portion.

7. The center floor panel of claim 1, wherein a rear extended portion, which extends backwardly from the floor tunnel portion to be inserted into the rear crossmember, is formed at a rearmost center floor member among the plurality of center floor members.

8. The center floor panel of claim 7, wherein the rear extended portion has a cross-section that corresponds with the floor tunnel portion, and a space that corresponds with a cross-sectional shape of the rear extended portion is formed at a lower end of the rear crossmember to couple the rear extended portion to the rear crossmember therethrough.

9. The center floor panel of claim 1, wherein the cross tunnel portion and the cross side extended portion are formed to have a cross-section in a box shape when viewed in a width direction of a vehicle body.

10. The center floor panel of claim 9, wherein the box shape of the cross side extended portion is inserted into the box shape of the cross tunnel portion.

11. The center floor panel of claim 10, wherein a supporting surface is formed to face a direction of inserting the cross side extended portion at the cross tunnel portion for supporting the cross side extended portion.

12. The center floor panel of claim 9, wherein welding portions to be respectively welded with a rear end of the center floor member and a front end of the center floor member are formed at the front ends and the rear ends of the cross tunnel portion and the cross side extended portion.

13. The center floor panel of claim 9, wherein a plurality of ribs are formed in a shape that connects an upper surface with a lower surface in the box shape at the cross side extended portion.

14. The center floor panel of claim 9, wherein the cross side extended portion is manufactured using die casting.

* * * * *